United States Patent [19]
Spitaels
[11] 3,865,999
[45] Feb. 11, 1975

[54] AUTOMATIC TELECOMMUNICATION SWITCHING SYSTEM

[75] Inventor: Josef Margaretha Desideer Spitaels, Antwerp, Belgium

[73] Assignee: International Standard Electric Corporation, New York, N.Y.

[22] Filed: Feb. 26, 1973

[21] Appl. No.: 335,531

[30] Foreign Application Priority Data

Feb. 25, 1972 Netherlands ........................ 7202501

[52] U.S. Cl. ........................ 179/175.2 R, 340/172.5
[51] Int. Cl. ........................................... H04m 3/22
[58] Field of Search... 179/175.2 R, 18 AG, 175.2 C; 340/172.5

[56] References Cited

UNITED STATES PATENTS

| | | | |
|---|---|---|---|
| 3,060,273 | 10/1962 | Nowak et al. | 179/175.2 R |
| 3,377,623 | 4/1968 | Reut et al. | 340/172.5 |
| 3,557,315 | 1/1971 | Kobus et al. | 179/18 AG |
| 3,623,011 | 11/1971 | Baynard et al. | 340/172.5 |
| 3,626,383 | 12/1971 | Oswald | 179/175.2 R |
| 3,786,430 | 1/1974 | Hajdu et al. | 340/172.5 |

*Primary Examiner*—Kathleen H. Claffy
*Assistant Examiner*—Douglas W. Olms
*Attorney, Agent, or Firm*—Delbert P. Warner; James B. Raden

[57] ABSTRACT

A switching system employs switching equipment and its control system includes two computers which are normally in an on-line load-sharing condition. Means are provided in case switching equipment must be tested to place either one of the computers first in a transient condition wherein it is able to continue the processing of calls but cannot handle new calls and then in a standby condition wherein it is prevented to handle calls but is able to test the switching equipment. Hereby the other computer remains in the on-line condition. Means are provided in case a fault occurs in the on-line computer during the tests to switch the standby computer back into the on-line condition and to complete calls started by the former on-line computer by accessing the memory thereof.

14 Claims, 10 Drawing Figures

FC2

AUTOMATIC TELECOMMUNICATION SWITCHING SYSTEM

The present invention relates to an automatic telecommunication switching system including switching equipment and a control system including at least two computers which are adapted to control the establishment and release of call communications through said swiching equipment.

Such an automatic telecommunication switching system is already known from Belgian Pat. No. 693 071 (R. SALADE et al 2-2-1).

When a switching system e.g. a telephone exchange must be extended the added switching equipment must obviously be thoroughly tested separately and preferably also in cooperation with the existing equipment before being effectively put into service. Such thorough extension tests when executed manually require much time and are therefore preferably executed under the control of a computer. An additional computer located in the exchange or connected therewith via data links is obviously an expensive solution.

An object of the present invention is therefore to provide an automatic telecommunication switching system of the above type wherein the extension tests may be executed without requiring the use of an additional computer.

According to a characteristic of the present invention this is achieved due to the fact that said control system further includes control means to co-operate with any one of said computers in order to bring said one computer in a standby condition wherein it is prevented to process new call communications but is able to execute test operations on said equipment.

When in such a system the other computer becomes faulty a total breakdown occurs since the computer in the standby condition is normally not able to take-over the call communications handled by the other processor.

Another object of the present invention is therefore to provide an automatic telecommunication switching system of the above type wherein a faulty other processor does not lead to a total breakdown of the system.

According to another characteristic of the present invention this is achieved due to the fact that when said computer in the standby condition is brought in the operative condition after the other computer has become faulty, it has access to a memory storing information at least about the call communications handled by said other computer.

Thus, the computer which is in the standby condition is able to take-over the call communications processed by the other computer when the latter becomes faulty.

The present invention also relates to a test method for a telecommunication switching network including a plurality of first and second telecommunication circuits and switching means constituted by a plurality of interlinked switching stages, and control means to control the establishment and release of paths between first and second circuits and through said switching means, said control means including test means to test the busy and free conditions of said first and second circuits and of said links.

The present test method is characterized in that it consists in testing the free and busy conditions of all the circuits and links to be tested successively before and after a path has been established between two of said circuits and via a number of said links, the whole test being successful when before establishing a path all circuits and links are found to be free, whereas after having established a path all but the circuits and links forming part of this path are found to be busy.

The present invention further also relates to a test method for a telecommunication switching network including a plurality of first and second telecommunication circuits and switching means constituted by a plurality of interlinked switching stages each comprising a plurality of crosspoints, and control means to control the establishment of paths between first and second circuits and through crosspoints of said switching means.

The present test method is characterized in that it consists in testing the continuity of a said path between said circuits and in executing a plurality of tests after a non-continuous first path has been detected each of said tests consisting in establishing a plurality of second paths having at least one circuit or one crosspoint in common with said first path and in checking the continuity of each of said second paths, each of said tests being stopped when all said second paths are non-continuous for a given test and in performing another test with another circuit or crosspoint in common when at least one of said second paths is found to be continuous.

The above mentioned and other objects and features of the invention will become more apparent and the invention itself will be best understood by referring to the following description of embodiments taken in conjunction with the accompanying drawings in which.

Figure 1:
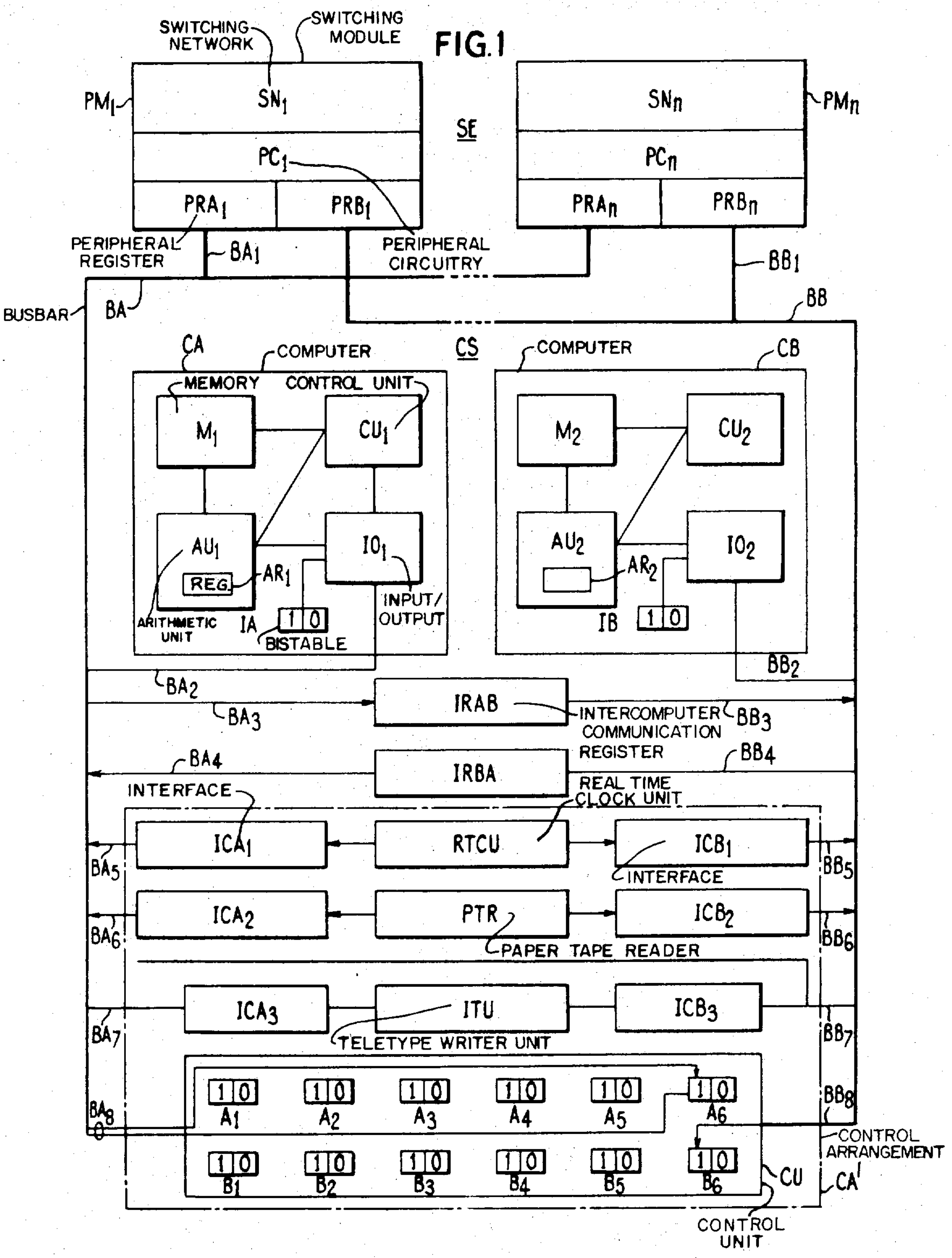
FIG. 1 is a schematic view of an automatic telecommunication switching system according to the present invention.
Figure 2:
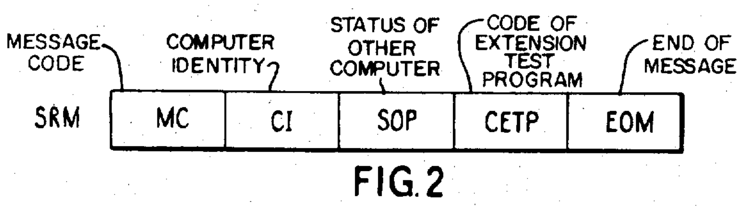
FIG. 2 is a schematic representation of a standby request message.
Figure 3:
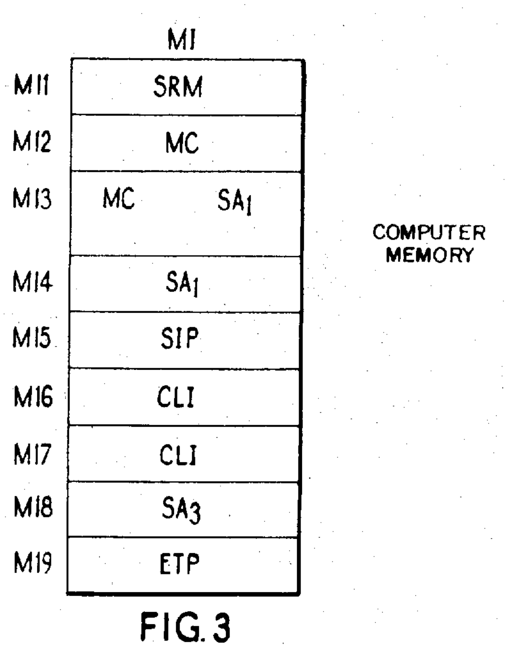
FIG. 3 is a schematic view of part of the memory M1 of the computer CA shown in FIG. 1.

Principally referring to FIG. 1 the automatic telecommunication switching system shown therein includes switching equipment SE and a control system CS which includes two computers CA and CB, interconnected by intercomputer communication registers IRAB and IRBA, and a control arrangement CA'.

The switching equipment SE is of the type disclosed in U.S. Pat. No. 3 557 315 (S. KOBUS et al 19-4-1-2-13) and is constituted by a plurality of switching modules such as PM1 and PM*n* which comprise each a switching network SN1, SN*n*, peripheral circuitry PC1, PC*n* and a pair of peripheral registers PRA1, PRB1; PRA*n*, PRBn. Each peripheral circuitry such as PC1, PC*n* includes scanner units (not shown) to scan lines and trunks of the switching network and a marker-driver unit (not shown) to mark, establish and release paths in this switching network. The peripheral registers PRA1 to PRA*n* are connected to the computer CA via the cable connection BA1 of the busbar BA, whilst the peripheral registers PRB1 to PRB*n* are connected to the computer CB via the cable connection BB1 of the busbar BB. The busbar NA is constituted by the cable connections BA1 to BA8, whilst the busbar BB comprises the cable connections BB1 to BB8.

The computers CA and CB are of a classical construction and each include a memory M1, M2, a control unit CU1, CU2, an arithmetic unit AU1, AU2 with an A-register AR1, AR2 and input-output circuitry IO1, IO2, these devices being interconnected as shown. The computers CA and CB further each include a bistable device IA, IB indicating the identity of the computer. Hereby IA and IB are always in the O-condition and in the 1-condition respectively. The input-output circuitries IO1 and IO2 of the computers CA and CB are connected to the busbars BA and BB by the cable connections BA2, BB2 respectively and to the bistable devices IA and IB. The input-output circuitries IO1 and IO2 are futher interconnected via the busbar BA (BA2, BA3) the intercomputer communication register IRAB and the busbar BB (BB3, BB2) and via the busbar (BB2, BB4) the intercomputer communication register IRBA and the busbar BA (BA4, BA2).

As described in the last mentioned U.S. patent the computers CA and CB operate on a load-sharing basis. They are adapted to simultaneously control the establishment of call communications through the switching equipment SE and to exchange relevant information about these call communications via the intercomputer communication registers IRAB and IRBA and store this information in their memory. When one of the computers CA and CB becomes faulty the other computer is able to take-over the call communications, which are in the conversation phase, processed by this one computer by using the call information about these call communications stored in its memory.

As also described in the last mentioned Belgian patent each of the two computers CA, CB is adapted to execute a plurality of programmes. More particularly, each of these computers every 14 milliseconds executes main clock level programmes which control the execution of urgent operations such as the scanning of lines and trunks to detect new calls, the reception of dialed information, etc. The remaining time of each 14 milliseconds period is used to execute less urgent programmes which are therefore called base level programmes, e.g. a take-over programme controlling the above take-over operation. Further, each programme may be interrupted by a programme having a higher priority. It should be noted that the 14 milliseconds periods of the two computers CA, CB are shifted by half a period with respect to each other.

Figure 10:
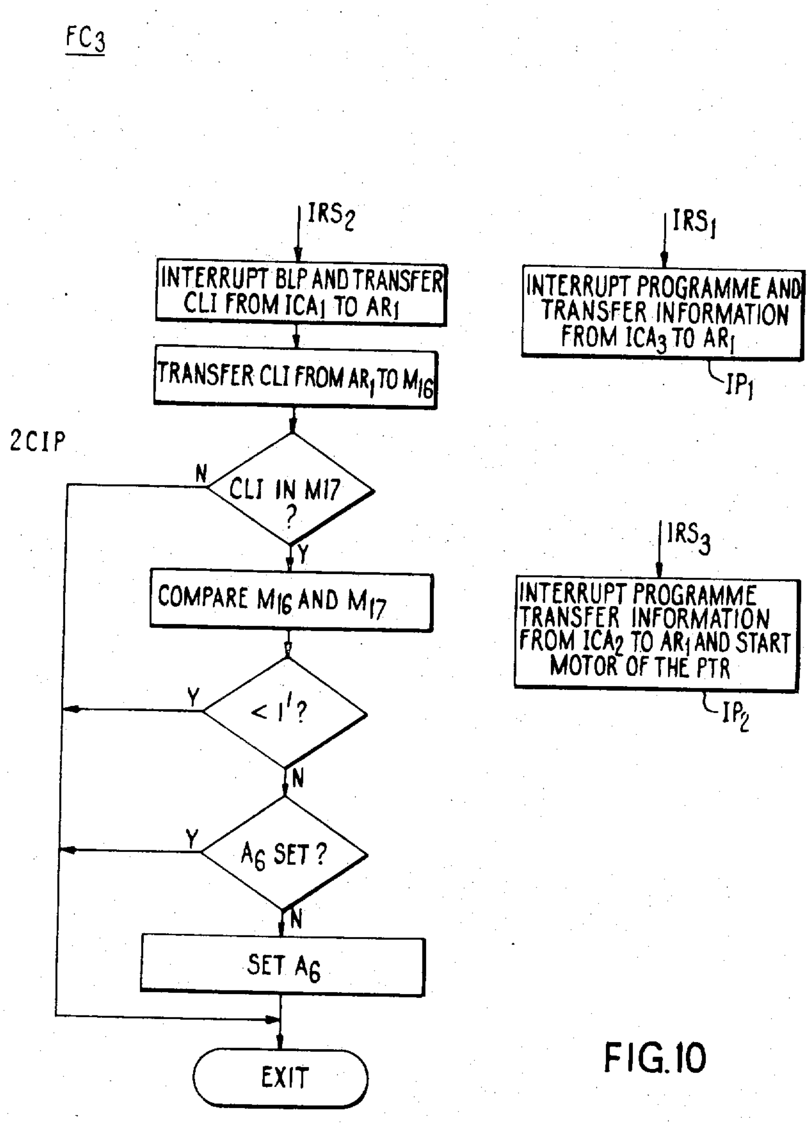

The control arrangement CA' includes a real time clock unit RTCU, a paper tape reader PTR which may be loaded with a paper tape on which extension test programmes are inscribed, a teletype writer unit TTU and a control unit CU which is of the type disclosed in Belgian Pat. No. 693 071 (R. SALADE et al 2-2-1). The RTCU, the PTR and the TTU are coupled to the busbars BA and BB via the interface circuitries ICA1, ICA2, ICA3 and ICB1, ICB2 and ICB3 respectively. Each interface circuitry is adapted to store and code information received from the RTCU, PTR or TTU and to issue an interrupt request to the computer to which it is connected when an information word has been stored therein. The control unit CU is also connected to the busbars BA and BB and includes the bistable devices A1 to A6 and B1 to B6 which indicate the status of the computer CA, CB to which they are associated. More particularly:

- the bistable device A1, B1 in its 1-condition indicates that the computer CA, CB is or must be brought in the operative condition;
- the bistable device A2, B2 in its 1-condition indicates that the computer CA, CB is adapted to execute or is executing a copying programme which consists in copying information from the operative computer CB, CA after the computer CA, CB has been successfully tested off-line. These tests are executed in case of a processor being faulty. By off-line condition of a computer is meant that the computer is not connected neither to the active peripheral modules nor to the other computer;
- the bistable device A3, B3 in its 1-condition indicates that the computer CA, CB is adapted to execute or is executing a read programme which consists in reading information from a tape forming part of said control arrangement and storing it in its own memory M1, M2;
- the bistable device A4, B4 in its 1-condition indicates that the computer CA, CB is or must be brought in its non-operative condition;
- the bistable device A5, B5 in its 1-condition indicates that the computer CA, CB is adapted to execute or is executing an off-line test programme;
- the bistable device A6, B6 in its 1-condition indicates that the computer CA, CB is adapted to be brought or is in the standby condition which is a condition wherein it is prevented to process new call communications but is still able to receive information concerning call communications processed by the other computer CB, CA. The bistable devices A6 and B6 were not included in the control unit CU disclosed in the last mentioned Belgian Pat. No. 693 071 (R. SALADE et al 2-2-1). Reference being made to FIGS. 1 to 3 and 8 to 10 it is hereinafter described in detail how the computer CA is brought in the above mentioned standby condition to test the switching equipment SE which may be partly or completely new. Hereby it should be noted that the flow charts FC1 and FC2 of FIGS. 8 and 9 arranged below each other and FC3 of FIG. 10 schematically represent the base level and interrupt programmes necessary to understand the operation of the present automatic telecommunication switching system.

A standby request message SRM (FIG. 2) is typed on the teletype writer unit TTU. This message comprises:

- a message code MC which indicates the request for being brought in the standby condition;
- the identity CI of the computer which must be brought in the standby condition. In the present case this identity is hence equal to that indicated by the bistable device IA (FIG. 1);
- the status SOP of the other computer CB. This status must correspond to the one represented by the 1-condition of one of the bistable devices B1, B4, B5 and B6 since bringing the computer CA in the standby condition is not allowed when the status of the computer CB is the one represented by the 1-condition of the bistable device B2 or B3. Typing the status of the computer CB is done in order that it should thus be positively indicated that one knows the status of this computer before bringing the computer CA in the standby condition.

the code CETP of the extension test programme ETP to be executed by the computer CA after the latter has been brought in the standby condition;

the end-of-message EOM.

The characters of the message SRM typed on the TTU are each coded and stored under the form information words in each of the interface circuitries ICA3 and ICB3. Each time such a word has been stored in an interface circuitry ICA3, ICB3 an interrupt request signal IRS1 (FC3, FIG. 10) is issued to the corresponding computer CA, CB via the corresponding busbar BA, BB by classical interrupt requesting means included in this circuitry. This IRS1 is received in the input-output circuitry IO1, IO2 of the computer CA, CB and the request is granted by this computer when no programme of higher priority is being executed, the latter programme being then interrupted. In the following description it will be assumed, for simplicity reasons, that the interupted programme always is a base level programme. Under the control of the interrupt programme IP1 (FC3, FIG. 10) which is then started the words stored in the interface circuitries ICA3 and ICB are transferred to the respective A-registers AR1 and AR2 forming part of the arithmetic units AU1 and AU2 respectively.

Since the further processing of the words stored in the ICA3 and the ICB3 is identical, only the processing of the words stored in the ICA3 is described in detail hereinafter.

After the execution of the interrupt programme IP1 the interrupted base level programme is continued. More particularly after a word has been received in the A-register AR1 it is checked (FC1, FIG. 8) if the message code MC has already been stored in the memory portion M11 (FIG. 3) of the memory M1 of the computer CA. In the negative the word stored in AR1 is transferred to M11 after which the following word is processed in the same way as described above. In the positive it is checked if the message code MC has already been stored in the memory portion M12 (FIG. 3) of the memory M1 of the computer CA.

If the MC has not yet been stored in M12 it is stored in M12 and with this MC a memory table M13 (FIG. 3) forming part of M1 is consulted. This table gives the relationship between various codes and start addresses of programmes and provides for MC the start address SA1 of a base level standby initialisation programme SIP. This SA1 is stored in the memory portion M14 (FIG. 3) of M1 and thereafter the word stored in AR1 is transferred to M11. The following word is then processed in the same way as described above.

If the MC had already been stored in M12 it is checked if the end-of-message EOM has already been stored in M11:

in the negative the word stored in AR1 is transferred to M11 after which the following word is processed in the same way as described above. From the above it follows that the MC, CI, SOP, CTP and EOM forming the standby request message SRM are successively stored in the memory portion M11 of M1;

in the positive the start address SA1 stored in M14 is used to find the standby initialisation programme SIP stored in the memory portion M15 (FIG. 3) of the memory M1 of processor CPA. The execution of this programme SIP may then be started if no programme of higher priority is being or must be executed.

Before describing the execution of the sepcial programme SIP in base level it should be noted that the programme stored in the memory M1 of the computer CA includes a so called 2 seconds clock interrupt programme 2 CIP (FC3, FIG. 10) which every 2 seconds stores the clock information CLI given by the real time clock unit RTCU in the memory portion M16 (FIG. 3) of the memory M1 of the computer CA. Indeed, every 2 seconds the clock information CLI of the RTCU is transferred to the interface circuitry ICA1 after which an interrupt request signal IRS2 is issued to the computer CA via the busbar BA under control of classical interrupt requesting means included in this circuitry (FC1). Such an IRS2 is received in the input-output circuitry IO1 of the computer CA and the request is granted by this computer when no programme of higher priority is being executed. The programme which is being executed and which is supposed to be a base level programme is then interrupted. Under the control of the 2 seconds clock interrupt programme 2 CIP (FC3, FIG. 10) which is then started the clock information CLI stored in the interface circuitry ICA1 is transferred into the A-register AR1 forming part of the arithmetic unit AU1 and from there into the memory portion M16 of M1. The 2 CIP is then continued by checking if the clock information CLI has already been stored in the memory portion M17 of the memory M1 of the processor CPA.

in the negative, as is now the case, the 2 CIP is stopped and the interrupted base level programme is continued;

in the positive the clock information stored in M16 and M17 are compared as will be described later.

Figure 8:
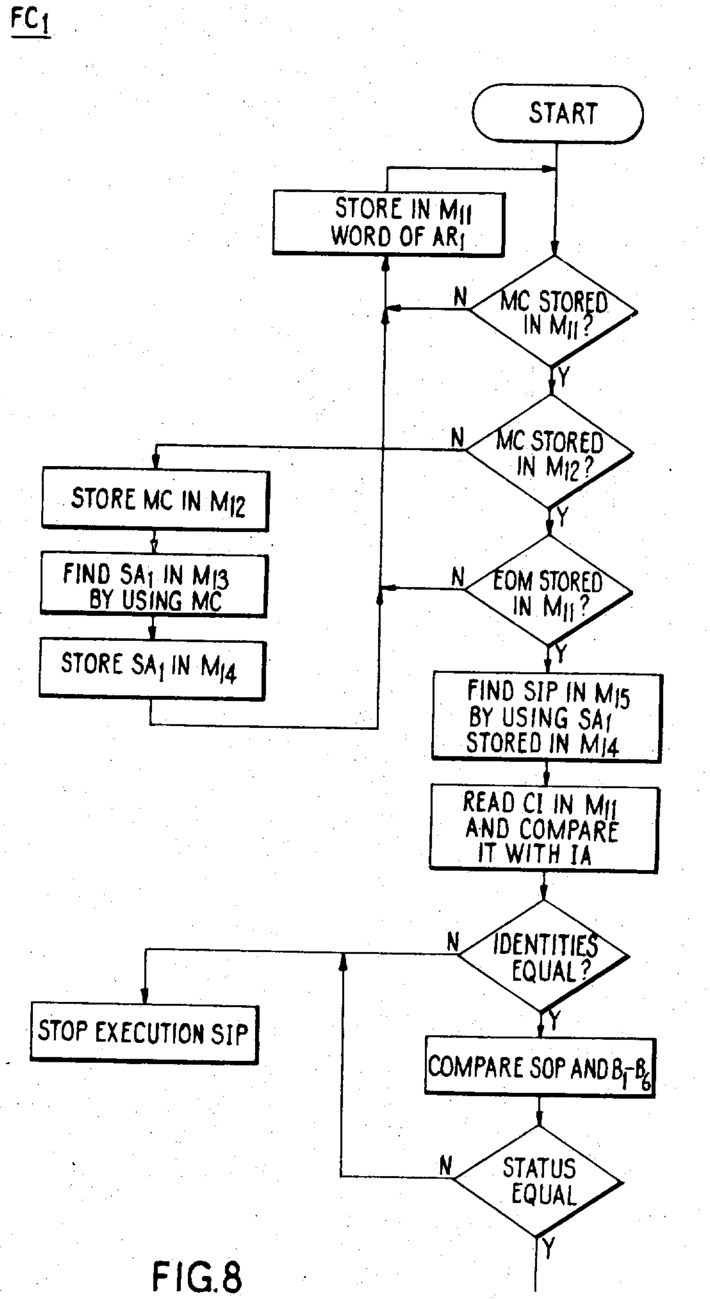
FIGS. 8 to 10 represent flow charts FC1, FC2, FC3 relating to the operation of the system according to FIGS. 1 to 3.
Figure 9:
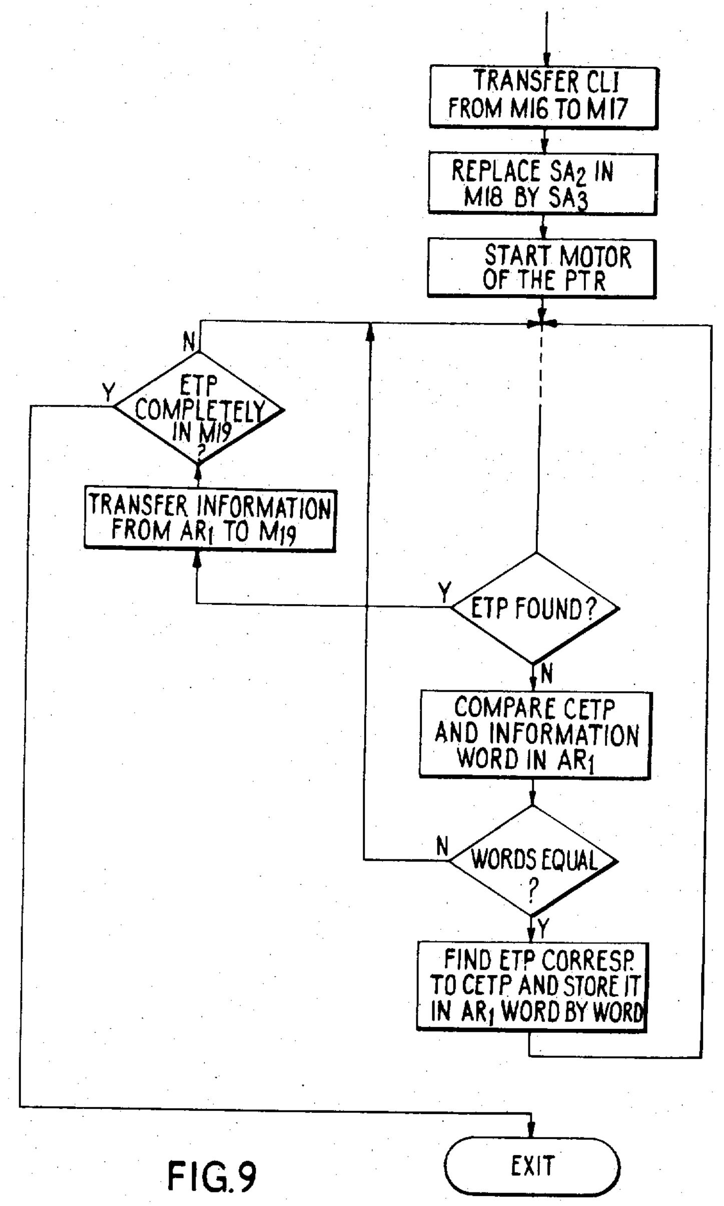

Under control of the above mentioned SIP, first the computer identity CI stored in the M11 is compared with the identity of the computer CA stored in the bistable device IA of this computer (FC1, FIG. 8).

If these identities are not equal, as is the case for computer CB, the execution of the standby initialisation programme SIP is stopped. On the contrary, if these identities are equal, as is now the case for computer CA, the status SOP of the computer CB is compared with the one registered in the bistable devices B1 to B6. If both status are different the execution of the SIP is stopped, whereas if they are equal, as is supposed, the clock information CLI stored in M16 in stored in M17. Thereafter the start address SA2, stored in M18, of the above mentioned main clock interrupt programmes which executed every 14 milliseconds is modified into SA3 to bring the computer CA in a transient condition prior to being brought in the standby condition. Finally, the motor of the paper tape reader PTR which amongst other programmes stores the extension test programme ETP is started. This motor displaces the paper tape in a stepwise manner and automatically stops after each step.

It should be noted that the 14 ms clock interrupt programmes with address SA3 are much simpler than those with start address SA2 and are not adapted to control the scanning of lines and trunks in order to detect new calls. Hence during the simplified 14 ms clock interrupt programmes which interrupt the base level programme SIP after SA3 has been registered in M18 no new calls are handled by the computer CA which only continues the processing of the already started calls. This also means that no new calls are processed substantially from the moment the CLI has been registered in M17. This condition of the computer is a transient condition.

The modified programme is also adapted to control the checking of the call phases of all the call communications handled in ordered to detect if the latter all are in the conversation phase or not, these call phases being stored in status buffers (not shown). This phase is the one which starts when two subscribers are brought in communication with each other and which ends by the release of the communication of one of them. The scanning of the above status buffers is executed every 2 seconds and when all the call communications handled are found in the conversation phase the computer CA sets the bistable device A6 to its 1-condition. The set bistable device A6 provokes an interrupt to the computer CB via an interrupt channel which forms part of the busbar BB. This happens in an analogous way as described in the above mentioned Belgian Pat. No. 693 071 (R. SALADE et al 2-2-1). The latter computer is thus informed that it may execute a takeover programme in order to take-over all the call communications, handled by the computer CA, which are in the conversation phase i.e. in fact all call communications. Information about these call communications has been received in the computer CB from the computer CA via the intercomputer communication channel. It should be noted that the above scanning programme is a normally executed programme and that only the interpretation of the result of this scanning is special.

It may happen that due to a fault one or more call communications are never brought in the conversation phase. In this case the bistable device A6 will never be set in the above described way so that, if no precautions were taken, the computer CA would never be brought in the standby condition.

For this reason a time-out of 1 minute has been provided. Returning again to the 2CIP shown on FIG. 10, when the comparison of the clock information stored in M16 and M17 indicates that less than 1 minute has elapsed since the start of the transient condition, the 2CIP is stopped and the base level is continued. On the contrary, when this difference is larger than 1 minute the condition of the bistable device A6 is checked. When it has already been set, in the manner described above, the 2CIP is stopped whereas in the case it has not yet been set-as may happen in the case of a fault-the bistable device A6 is set. This has the consequences already described above.

The value of the time-out period has been chosen equal to 1 minute since it is supposed that after this time interval has elapsed all the call communications, for which there is no fault, are in the conversation phase.

It should be noted that in case equipment is tested which is not effectively in use the above scanning programme will find that no calls are handled and will hence immediately bring the computer in the standby condition.

Returning again to the SIP, each time the above mentioned motor of the PTR stops information on the paper tape is coded and stored as an information word in the interface circuitry ICA2 and consequently an interrupt request signal IRS3 is then issued to computer CA via the busbar BA. When this interrupt request is granted an interrupt programme IP2 (FC3, FIG. 10) is started and under control of this programme the base level programme is interrupted and the information stored in ICA2 is transferred to AR1. Thereafter the motor of the PTR is started and the base level programme is continued. During this programme it is checked if an extension test programme ETP has already been found:

If an ETP has not yet been found the code word CETP stored in M12 is compared with the code word stored in AR1 and it is checked if both code words are equal or not:

- if not equal the base level programme is continued and this programme will be interrupted in the manner described above after the reader has read another code word on the tape;
- if equal the ETP corresponding to CETP is searched on the tape and when the corresponding test programme is found this extension test programme is read by the paper tape reader PTR and for each programme word stored in ICA2 an interrupt request signal IRS3 is sent to the computer CA. The further operations are then as described above.

If an ETP has already been found the programme word stored in AR1 is transferred to M19 (FIG. 3) and it is checked if the ETP has already been completely received in M19. In the negative the base level programme is continued and this programme will be interrupted in the manner described above. In the positive the base level programme is definitively continued.

After the ETP has thus been completely stored in M19 it is executed in base level. Thereafter the computer in the standby condition is brought back on-line by first stopping it and then executing the normal procedure to go back on line described in the above mentioned Belgian Pat. No. 693 071 (R. SALADE et al 2-2-1).

In case the computer on-line becomes faulty the computer in the standby condition is brought on-line and continues the handling of the call communications of which information was stored in its memory during its operation in standby. Obviously it also treats new call communications. The system hence remains operative.

After the faulty computer has been repaired the other computer which is now on-line is again brought in the standby condition and continues the execution of the extension tests.

In the above described system each of the computers CA and CB has its own memory M1 and M2 respectively. When these computers instead have a common memory, it is clear that a total breakdown of the system also does not occur when the computer which is not in the standby condition becomes faulty since the computer in the standby condition is able to take over the call communications handled by the faulty processor when it has access to the part of the common memory storing information about these call communications.

Figure 4:
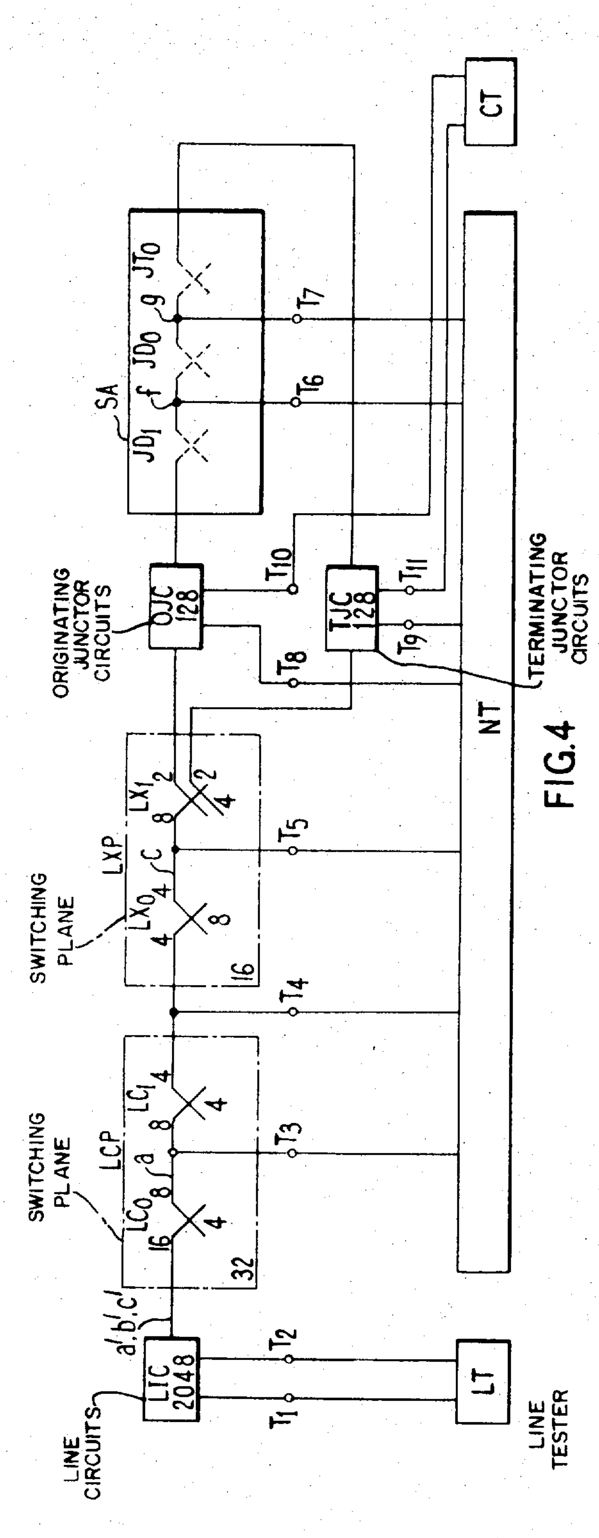
FIG. 4 shows part of the switching network SN1 and the peripheral circuitry PC1 represented in FIG. 1.

Principally referring to FIG. 4, the part of the switching network SN1 shown includes the interconnection via switching means of 2048 line circuits LIC, 128 originating junctor circuits OJC and 128 terminating junctor circuits TJC. The 2048 line circuits LIC are connected to the 128 originating junctor circuits OJC via four switching stages LCO, LC1, LXO and LX1. The switching stages LCO and LC1 are arranged in 32 planes LCP, whilst the switching stages LXO and LX1 are arranged in 16 planes LXP. Each of the 32 switching planes LCP comprises four LCO switches with 16 inputs and eight outputs and four LC1 switches with eight inputs and 4 outputs. The outputs of each of the four LCO switches are connected to the inputs of each of the four LC1 switches via *a*-links so that each of the inputs of these four LCO switches has access to any of the outputs of the eight LC1 switches via an *a*-link and vice-versa. Each of the 16 switching planes LXP comprises eight LXO switches with four inputs and four outputs and four LX1 switches with eight inputs and 4 outputs. The outputs of each of the eight LXO switches are connected via *c*-links to each of the four LX1 switches in such a manner that each input of the four LXO siwtches has access to any of the outputs of the four LX1 switches via a *c*-link. The output of each of the 32 LCP planes are connected to any of the 16 LXP planes via *b*-links in such a manner that finally each input of the switching stage LCO has access to any of the outputs of the switching stage LX1 via an *a*-, *b*- and *c*-link. Since the 2048 line circuits LIC are connected to the inputs of the LCO stage whilst the originating and terminating junctor OJC and TJC are connected to the outputs of the LX1 stage each line circuit has access to any of the originating and terminating junctor circuits, but there exists only a single path between each line circuit and each of these junctor circuits. With regard to the connection of the line circuits to the switching stage LCO it should be noted that this connection (not shown) is realised in such a manner that a line circuit has access to only four of the eight outputs of the LCO switch to which it is connected.

The 128 originating junctor circuits OJC are further connected to the 128 terminating junctor circuits TJC of the switching module shown via a switching arrangement SA which includes three switching stages JD1, JD0 and JT1 interconnected by *f*- and *g*-links. It should be noted that the outputs of the JDO stage shown are also connected to the TJC of all the even numbered modules, whereas other not shown outputs of this JDO stage are connected to the TJC of all the odd numbered modules.

The single line connections between the LIC, OJC, TJC and the switching LCO, LC1, LXO, LX1, JD1, JDO, JTO are in fact constituted by three conductors, and more particularly by two speech conductors *a'* and *b'* and one control conductor *c'to* provided to mark and hold a connection. These marking and holding operations are described in detail for a connection between a line circuit and an originating junctor in Belgian Pat. No. 709,717 (H. ADELAAR et al 56-4).

Each of the 2048 line circuits LIC has two test points T1 and T2 which are connected to a line tester LT. Test point T1 is used to check if the line connected to the line circuit LIC forms part of a closed or open loop, and test point T2 is used to check the condition of a cut-off relay included in this line circuit LIC, as will be described later. The various *a*-, *b*-, *c*-, *f*- and *g*-links each have a test point such as T3 to T7 and the originating and terminating junctors OJC and TJC each have a test point such as T8 and T9, all these test points being connected to a network tester NT. The test points T3 to T7 are used to check the busy or free condition of the links and the test points T8 and T9 are used to check the busy or free condition of the originating and terminating junctors. The latter junctors OJC and TJC further each have a test point T10, T11, these test points being connected to a circuit tester CT. The test point T10 is used to check in the originating junctor if a calling line forms part of a closed or open loop, whilst the test point T11 used to check in the terminating junctor if a called line forms part of a closed or open loop. The above testers LT, NT and CT are controlled by the computer and form part of the peripheral circuitry PC1 shown in FIG. 1.

Figure 5:
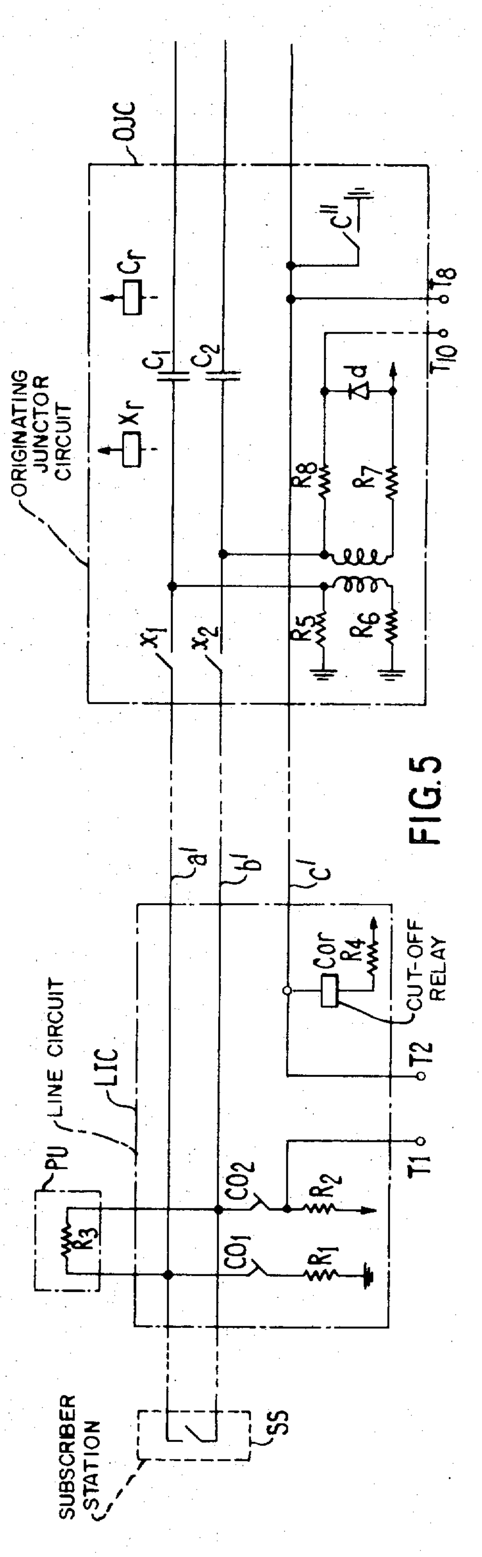
FIG. 5 represents a line circuit LIC and an originating junctor circuit OJC of FIG. 4 in more detail.

Principally referring to FIG. 5 the latter shows a line circuit LIC and an originating junctor circuit OJC in more detail. In the line circuit LIC which is connected to a subscriber station SS a ground is connected to the speech conductor *a'* via the series connection of a resistance R1 and a break contact *co*1 of a cut-off relay Cor, whilst a battery is connected to the speech conductor *b'* via the series connection of a resistance R2 and another break contact *co*2 of the cut-off relay, the test point T1 being the junction point of R2 and *co*2. The control conductor *c'* is connected, on the one hand to battery via relay *Cor* and resistance R4 and, on the other hand, to the test point T2. A plug-in unit PU comprising a resistance R3 may be branched across the speech conductors *a'* and *b'* to realise a closed line loop in an artificial way for test purposes. In the originating junctor circuit OJC the speech conductors *a'* and *b'* are interrupted by the make contacts *x*1 and *x*2 of a relay X*r*. The speech conductor *a'* is further connected to ground via a parallel circuit comprising, on the one hand resistance R5 and on the other hand the series connection of the primary winding of a transformer T*r* and resistance R6. The speech conductor *b'* is connected to battery via a parallel circuit comprising, on the one hand the secondary winding of transformer Tr and resistance R7 in series and, on the other hand resistance R8 and diode *d* in series. The junction point of R8 and d is coupled to the test point T10 via not shown circuitry. Finally, the control conductor *c'* is coupled to ground via make contact *c'* of a relay Cr and connected to test point T8.

It should be noted that the transformer T*r* and the associated circuitry form a feeding bridge to feed a telephone microphone in a substation such as SS connected to the OJC via an LIC. In this OJC capacitors C1 and C2 are provided in the speech conductors *a'* and *b'* leading to the switching arrangement SA shown in FIG. 4. It should further be noted that the resistance R5 and the series circuit constituted by the resistance R8 and the diode d are circuits adapted to dissipate the energy stored in the transformer windings upon the line *a'*, *b'* being opened.

In the line circuit LIC the test points T1 and T2 are used as follows:

- when the line loop becomes closed, either in the subscriber station SS connected to the line *a'*, *b'* or through the resistance R3 of the plug-in unit PU, a potential variation occurs in the test point T1 due to the fact that a current is then able to flow from ground to battery via the substation SS or via the resistance R3. This potential variation will be detected by the line tester LT;
- when a connection is established between an OJC and a LIC relay Cor is energized by a 48 Volts voltage or by a ground potential (not shown) applied to conductor *c'* in the OJC. Due to this, a potential variation occurs in the test point T2 and will also be detected by the line tester LT.

In the originating junctor circuit OJC the test points T8 and T10 are used as follows:

when the relay Cr is energized under the control of the computer make contact $c''$ thereof is closed so that a ground appears on the control conductor $c'$ and hence on the test point T8 thus indicating the busy condition of the originating junctor circuit OJC. This potential variation will be detected by the network tester NT;

when the relay Xr has been energigzed under control of the computer in order to connect the above mentioned feeding bridge to the line circuit LIC the contacts $x1$ and $x2$ are closed, so that current then flows from ground to battery in the following circuit: ground, resistance R6 and primary winding of transformer Tr in parallel with resistance R5, make contact $x1$, conductor $a'$ of the links $c$, $b$, $a$ closed contact in the subscriber station SS or resistance R3 in the plug-in unit PU, conductor $b'$ of the links $a$, $b$, $c$, make contact $x2$, secondary winding of transformer $Tr$ and resistance R7 in parallel with resistance R8 and diode $d$, battery. Thus a potential variation occurs at the test point T10 indicating the above loop closure. This potential variation will be detected by the circuit tester CT.

Also for the links $a$, $b$, $c$ there occurs a potential variation in the test points T3 to T7 when they are used in an OJC-LIC connection. These potential variations will be detected by the network tester NT.

As an example a description will be given hereinafter of the test of the line circuits LIC, the originating junctor circuits OJC, the $a$-, $b$- and $c$-links and the crosspoints of the switching stages LCO, LC1, LX1 of a switching module.

First a plug-in unit PU is connected between the speech conductors $a'$, $b'$ in each of the line circuits LIC in order to realize a closed line loop. Afterwards the following operations are executed in succession:

1. The busy/free condition of all the line circuits, links and originating junctor circuits of the module is tested by the line and network testers LT and NT. The identities of the circuits and links which are found to be in a non-free condition are stored in memory in order that they should not be tested again. Afterwards the following operation is executed.
2. It is tried to establish a connection between a predetermined originating junctor OJC and a predetermined line circuit LIC, by means of a marker-driver circuit (not shown) controlled by the above mentioned computer. These circuits and links are made busy after the execution of this operation. If this operation is not successful no end-of-job signal is received from the marker-driver and in this case the test is stopped and the last mentioned circuits and links are checked. On the contrary, the following operation is executed when the test is successful.
3. The continuity of the control conductor $c'$ of the LIC-OJC connection is checked by checking the busy condition of the cut-off relay Cor in the predetermined LIC. This is done at the test point T2 by the line tester LT. If this test is not successful a fault search to be described later is executed, whereas if this test is successful the following operation is performed.
4. It is checked if the predetermined line and originating junctor circuits as well as the three $a$-, $b$- and $c$-links forming part of the established connection are busy and if all the other line and originating junctor circuits and links are free. This operation is performed by the line and network testers LT and NT. The identities of the line and originating junctor circuits and the links which are not found in the required condition are stored in memory in order that they should not be tested again. Afterwards the following operation is executed.
5. In the predetermined originating junctor circuit OJC, by means of the circuit tester CT it is checked if the calling line loop is open (by $x1$, $x2$). If this test is not successful the identity of the junctor circuit is registered in memory and the following operation is executed. This operation is also performed when the test is successful.
6. Relay $Xr$ is energized in the predetermined originating junctor circuit in order to connect by $x1$, $x2$ the feeding bridge including the transformer Tr to the speech conductors $a'$, $b'$. If this operation is not successful the identity of the junctor circuit is registered in memory and the following operation is executed. This operation is also performed when the test is successful.
7. In the predetermined originating junctor circuit by means of the circuit tester CT the continuity of the speech conductors $a'$ and $b'$ of the LIC-OJC connection is checked by checking if the calling line loop is closed. A fault search to be described later is made when the test is unsuccessful and thereafter the following operation is executed. The latter is also performed when the test is successful.
8. It is tried to release the connection established between the predetermined LIC and OJC. If this operation is unsuccessful no end-of-job signal is received from the marker-driver and in this case the test is stopped, whereas it is continued by the following operation if the test is successful.
9. It is checked by means of the line tester LT if the relay $Cor$ of the predetermined LIC has been released. If the Cor relay is still operated by the busy or free condition of the predetermined junctor circuit OJC is tested by means of the circuit tester CT. If the junctor is free as should normally be the case its identity is stored in memory and connection between the next LIC and the same OJC is checked in the same way as described above. If the junctor is busy the identities of the links involved and the junctor are stored in memory in order not to be tested again.

As described in the above, when the operations 3 and 7 are unsuccessful a fault search is made. This search will hereinafter be described in detail.

Figures 6, 7:
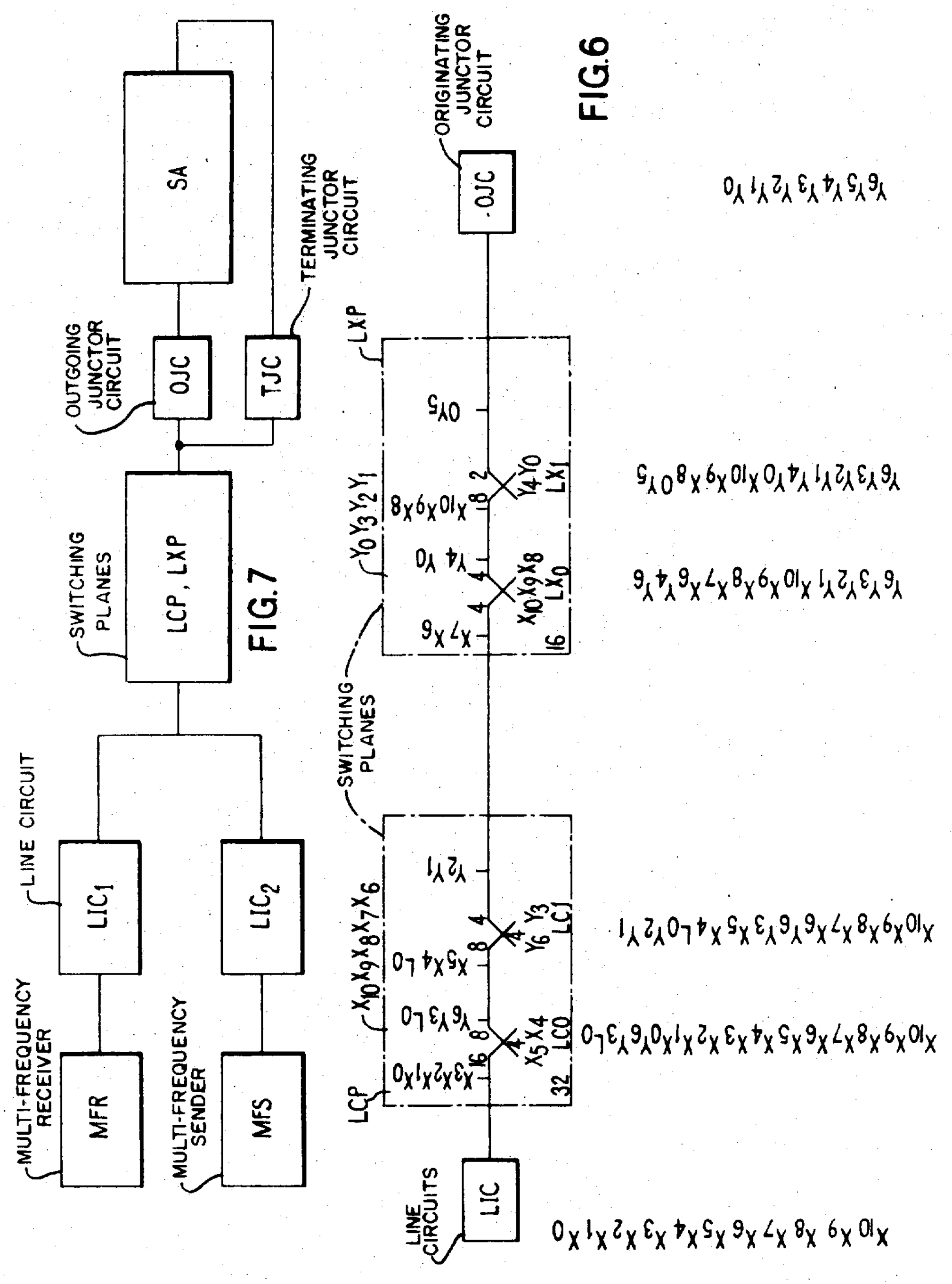
FIG. 6 shows the identities of part of the circuits shown in FIG. 4.
FIG. 7 represents a special test circuit to test part of the switching network shown in FIG. 4.

Reference is however first made to FIG. 6 wherein the identities of the line and originating junctor circuits, of the links $a$, $b$, $c$ and of the crosspoints of the switching stages LOCO, LC1, LXO and LX1 are indicated. Hereby it should be reminded that each line circuit has access to any of the originating junctor circuits and vice-versa, but that there exists only a single path between a predetermined line circuit and a predetermined junctor circuit. Therefore, from the identities of the line circuits and the originating junctor circuits the identities of the *a*-, *b*- and *c*-links and of the cross-points forming part of the paths between these line and originating junctor circuits may be determined, as will be explained hereinafter.

Since there are 2,048 or $2^{11}$ line circuits they may be identified by
X10 X9 X8 X7 X6 X5 X4 X3 X2 X1 X0
wherein each of the X's represents a binary bit which may hence have the value 0 or 1.
Hereby:

X10 X9 X8 X7 X6 identify the 32 = $2^5$ planes LCP;
X5 X4 identify the 4 = $2^2$ LC0 switches in each of the planes LCP;
X3 X2 X1 X0 identify the 16 = $2^4$ line circuits LIC connected to a same LCO switch.

Since there are 128 or $2^7$ originating junctor circuits they may be identified by
Y6 Y5 Y4 Y3 Y2 Y1 Y0 wherein each of the Y's represents a binary bit which may hence have the value 0 or 1. These 128 junctors are supposed to be arranged in eight rows and 16 columns so that these rows and columns may be identified by Y6 Y3 Y2 Y1 and Y5 Y4 Y0 respectively.

Supposing that the eight outputs of each of the 16 planes LXP are connected to the eight junctors of a distinct one of the 16 columns, it is clear that these planes LXP may be identified by Y6 Y3 Y2 Y1. Further supposing that in each of the planes LXP two outputs of each of the 4 switches LX1 are connected to two junctors characterized by a same value of the bits Y4 and YO, it is clear that these four switches LX1 may be identified by Y4 Y0. For instance:

the first and second outputs of the first switch LX1 are connected to the first and fifth junctors of a column respectively;
the first and second outputs of the second switch LX1 are connected to the second and sixth junctors of this column respectively;
the first and second outputs of the third switch LX1 are connected to the third and seventh junctors of this column;
the first and second outputs of the fourth switch LX1 are connected to the fourth and eighth junctors of this column.

When the first outputs of the four switches LX1 are connected to four junctors characterized by Y5 = 0, whilst their second outputs are connected to 4 junctors characterized by Y5 = 1, it is clear that these two outputs are identified by Y5. In order to distinguish them from the two outputs connected to the terminating junctor circuits TJC the bit 0 is added, so that the two outputs of each switch LX1 connected to the originating junctors are identified by OY5.

Since the interconnection of the switching stages LC1 and LX0 is made in such a way that:

the 16 first outputs of each of the 32 planes LCP are connected to the first inputs of the LXO switches of the 16 planes LXP;
the 16 second outputs of each of the 32 planes LCP are connected to the second inputs of the LXO switches of the 16 planes LXP, etc. it is clear that the first four planes LCP are connected to the first LXO switch, whilst the following four planes LCP are connected to the second LXO switch, etc. Hence the eight LXO switches may be identified by X10 X9 X8 and the four inputs of each of these selectors may be identified by X7 X6.

From the above it also follows that the four outputs of each of the LXO switches are identified by Y4 Y0, whilst the eight inputs of the LX1 switches are identified by X10 X9 X8, and that the 16 outputs of the four LC1 switches of a plane LCP each correspond to one of the 16 planes LXP. The switches LC1 are hence identified by Y6 Y3, whilst the outputs of an LC1 switch are identified by Y2 Y1.

Since each LCO switch is connected to each of the LC1 switches by two a-links, these links may be differentiated by a bit LO so that the outputs of the LCO switches may be identified by Y6 Y3 Y0, whilst the inputs of the LC1 switches may be identified by X5 X4 L0.

Since each crosspoint of a switch interconnects an input and an output of this switch, its identity is that obtained by juxtaposing the identities of this input and output. Consequently:

X10 X9 X8 X7 X6 X5 X4 X3 X2 X1 X0 Y6 Y3 L0 identifies the crosspoints of the LCO switches;
X10 X9 X8 X7 X6 Y6 Y3 X5 X4 L0 Y2 Y1 identifies the crosspoints of the LC1 switches;
Y6 Y3 Y2 Y1 X10 X9 X8 X7 X6 Y4 Y0 identifies the crosspoints of the LXO switches;
Y6 Y3 Y2 Y1 Y4 Y0 X10 X9 X8 OY5 identifies the crosspoints of the LX1 switches.

The above mentioned fault search which is performed when an established connection between a predetermined LIC and a predetermined OJC has been found faulty comprises the following successive operations during each of which the continuity of a plurality of paths is tested, at least the element to be tested being common to all these paths. For the control conductor *c'* this is done in the line circuit wherein the condition of the *Cor* relay is tested by means of the line tester LT and for the speech conductors *a'* and *b'* the check is performed in the originating junctor by testing the line loop condition by means of the circuit tester CT.

1. Test if the LIC is faulty or not.

A connection is tried to be established between the predetermined LIC and 31 other originating junctors the identities of which differ from the predetermined one by the bits Y6 Y3 Y2 Y1 Y0. If all new connections are bad the test is stopped since the probability is high that the predetermined LIC is faulty. On the contrary, if one of the new connections is good the predetermined LIC is certainly good and therefore the following test is executed.

2. Test if the predetermined OJC is faulty or not.

A connection is tried to be established between the predetermined OJC and 127 other line circuits the identities of which differ from the predetermined on by the bits X10 X9 X8 X7 X6 X5 X3 X2. If all new connections are bad the test is stopped since the probability is high that the predetermined OJC is faulty. On the contrary, if one of the new connections is good the predetermined OJC is certainly good and therefore the following test is executed.

3. Test if the predetermined LCO crosspoint is faulty or not.

A connection is tried to be established between the predetermined LIC and 31 other OJC the identities of which differ from the predetermined one by Y5 Y4 Y2 Y1 Y0. By this variation the LCO and LC1 crosspoints are maintained the same as follows from their identities. If all the connections are faulty the LCO crosspoint is probably faulty and therefore the test is stopped. If, on the contrary, one of the connections is good the crosspoint LCO is certainly good and therefore the following test is executed.

4. Test if the predetermined LXO crosspoint is faulty or not.

A connection is tried to be established between the predetermined OJC and 63 new line circuits the identity of which differs from the predetermined one by X5 X4 X3 X2 X1 and between all the 64 involved line circuits and another OJC the identity of which differs from the predetermined by the value of the bit Y5. Thus 127 new connections are tried to be established. Since the identity of the predetermined LXO crosspoint is Y6 Y3 Y2 Y1 X10 X9 X8 X7 X6 Y4 Y0 all the above 127 new paths pass therethrough. If all new connections are faulty the test is stopped since the probability is high that the predetermined crosspoint LXO is faulty. However, if one of these new connections is good the predetermined LX0 crosspoint is certainly good and therefore the following test is executed.

5. Test if the predetermined LX1 crosspoint is faulty or not.

A connection is tried to be established between the predetermined OJC and 255 other line circuits the identities of which differ from the predetermined one by the bits X7 X6 X5 X4 X3 X2 X1 X0. Since the identity of the LX1 crosspoint is Y6 Y3 Y2 Y1 Y4 Y0 X10 X9 X8 Y5 the new connections also pass through this crosspoint. If all new connections are bad the test is stopped since the probability is high that the predetermined LX1 crosspoint is faulty. On the contrary, if one of the new connections is good the predetermined LX1 crosspoint is certainly good and therefore one executes the following test.

6. Test if the predetermined LC1 crosspoint is faulty or not.

A connection is tried to be established between the predetermined LIC and three other junctor circuits the identity of which differs from the predetermined one by Y5 Y4. Since only Y5 Y4 is modified the predetermined LC0, LC1 and LX0 crosspoints are also used in the newly established path. If the new connection is faulty the test is stopped sinoe the probability is high that the predetermined LC1 crosspoint is faulty. On the contrary, if the new connection is good the predetermined crosspoint is certainly good.

In the above described example of a LIC-OJC connection, in order to check the condition of the speech conductors *a'* and *b'* the line loop is checked in the OJC. Such a test is however impossible in case a connection between two line circuits is considered. Indeed, such a connection is established via an OJC and a TJC, the former having the capacitors C1 and C2 in its speech conductors *a'* and *b'*. In this case it is therefore necessary, as shown in FIG. 7 to connect a multi-frequency sender MFS and a multi-frequency receiver MFR to the one and the other of the line circuits respectively. The tests are executed in a similar way as described above, but this time the condition of the speech conductors *a'* and *b'* is checked in the line circuit connected to the receiver circuit MFR and after the sender circuit MFS connected to the other line circuit has been operated.

While the principles of the invention have been described above in connection with specific apparatus, it is to be clearly understood that this description is made only by way of example and not as a limitation on the scope of the invention.

I claim:

1. An automatic telecommunication switching system comprising switching equipment, a control system including two computers adapted to control the establishment and release of call communications through said switching equipment, said control system further including control means cooperative with one of said computers to place said one computer in a standby condition wherein it is prevented from processing new call communications but is able to execute test operations on said switching equipment.

2. An automatic telecommunication switching system according to claim 1, in which said computer in the standby condition is placed in the operative condition when the operating computer has become faulty, and the computer in the standby condition has access to a memory storing information at least about the call communications handled by said other computer.

3. An automatic telecommunication switching system according to claim 2, in which said computers each have an individual memory, intercommunication means interconnecting said memories, each computer employing said intercommunication means to store information concerning call communications handled by said other computer in the memory of the computer in the standby condition.

4. An automatic telecommunication switching system according to claim 1, in which said test operations are used to test newly added switching equipment before putting the latter into service.

5. An automatic telecommunication switching system according to claim 1, in which said test operations are used to test existing and newly added switching equipment before putting the newly added switching equipment into service.

6. An automatic telecommmunication switching system according to claim 1, in which said control means are able to initiate in both said computers the execution of a special program to place one of these computers first in a transient condition and then in said standby condition, said one computer in said transient condition being prevented from handling new call communication but being able to continue the processing of already started call communications.

7. An automatic telecommunication switching system according to claim 6, in which said computers each have an individual memory and said special program includes placing said one computer in said transient condition by modifying and operational program stored in said memory.

8. An automatic telecommunication switching system according to claim 6, in which said special program includes counting a predetermined time interval and placing said one computer in said standby condition after said predetermined time interval has elapsed.

9. An automatic telecommunication switching system according to claim 6, in which said special program includes checking whether all said call communications are in a communication phase and in bringing said one computer in said standby condition when said checking operation has been successful.

10. An automatic telecommunication switching system according to claim 6, in which said special program includes placing said one computer in said transient condition, starting the counting of a predetermined time interval, checking to see whether all said call communications are in a communication phase, and placing said one computer in said standby condition when either said predetermined time interval has been counted or said checking has been successful.

11. An automatic telecommunication switching system according to claim 6, in which said control means are able to feed to both said computers information containing the identity of the computer to be brought in said standby condition, the execution of said special program in a said computer before possibly placing it in said transient condition including the comparison of the computer identity stored in said information and the identity of the computer stored in the memory thereof, the special program being only continued when this comparison is successful.

12. An automatic telecommunication switching system according to claim 6, in which said control means are able to feed information to both said computers containing the status of the computer not to be placed in said standby condition, the execution of said special program in a said computer before possibly placing it in said transient condition including the comparison of the computer status stored in said information and the condition of the computer stored in the memory thereof, the special program being only continued when this comparison is successful.

13. An automatic telecommunication switching system according to claim 6, in which said special program further includes signalling to the other computer that it has been brought in said standby condition in order that the latter be informed that it should execute a take-over program stored in said memory in order to take-over the call communications processed by said one computer.

14. An automatic telecommunication switching system according to claim 6, in which said special program also includes loading a test program containing said test operations from an outside memory in said memory.

* * * * *